United States Patent [19]

Dowe et al.

[11] Patent Number: 5,694,621
[45] Date of Patent: Dec. 2, 1997

[54] UNDERWATER ONE-TIME-USE CAMERA WITH MAGNETIC TORQUE COUPLING FOR FILM WINDING

[75] Inventors: David Reynolds Dowe, Holley; Harold James Barrett, Brockport; Edward Paul Furlani, Lancaster, all of N.Y.

[73] Assignee: Eastman Kodak Company, Rochester, N.Y.

[21] Appl. No.: 711,353

[22] Filed: Sep. 5, 1996

[51] Int. Cl.⁶ ........................................ G03B 17/08
[52] U.S. Cl. ................................ 396/25; 396/29
[58] Field of Search ........................ 396/14, 17, 25, 396/26, 27, 28, 29, 6; 310/104

[56] References Cited

U.S. PATENT DOCUMENTS

| | | | |
|---|---|---|---|
| 3,860,937 | 1/1975 | Wolfe | 354/64 |
| 4,025,930 | 5/1977 | Wolff | 354/64 |
| 4,277,707 | 7/1981 | Silver et al. | 310/104 |
| 4,747,744 | 5/1988 | Dominique et al. | 417/420 |
| 4,882,600 | 11/1989 | Van De Moere | 396/29 |
| 4,996,544 | 2/1991 | Fiorda | 354/64 |
| 5,045,026 | 9/1991 | Buse | 464/29 |
| 5,056,902 | 10/1991 | Chinnock et al. | 359/503 |
| 5,359,992 | 11/1994 | Hori et al. | 396/17 |
| 5,376,862 | 12/1994 | Stevens | 310/75 |
| 5,461,438 | 10/1995 | Hargrave | 354/62 |

Primary Examiner—David M. Gray
Attorney, Agent, or Firm—Roger A. Fields

[57] ABSTRACT

An underwater camera comprising a water-resistant casing, a camera housing contained in the water-resistant casing, a manually rotatable thumbwheel positioned outside the water-resistant casing, and coupling means for rotationally coupling the thumbwheel to a film spool rotatably supported in the camera housing to permit the thumbwheel to be manually rotated to similarly rotate the film spool, is characterized in that the coupling means is a magnetic torque coupling including a driving ring of magnets fixed to the thumbwheel for rotation with the thumbwheel and a driven ring of magnets rotationally engaged with the film spool. The magnets of the driving ring and the magnets of the driven ring are magnetically coupled for synchronous rotation of the driving and driven rings to rotate the film spool when the thumbwheel is rotated.

6 Claims, 4 Drawing Sheets

UNDERWATER ONE-TIME-USE CAMERA WITH MAGNETIC TORQUE COUPLING FOR FILM WINDING

FIELD OF THE INVENTION

The invention relates generally to the field of photography, and in particular to underwater cameras. More specifically, the invention relates to a an underwater one-time-use camera with a magnetic torque coupling for film winding.

BACKGROUND OF THE INVENTION

Film and cameras that are all in one, commonly referred to as single-use or one-time-use cameras, have become well known. Typically, the one-time-use camera is a simple point-and-shoot type comprising a plastic, inner, main body part which supports a fixed-focus taking lens, a film metering mechanism with a rotatably supported metering sprocket, a manual film advance thumbwheel, a single-blade shutter, a manual shutter release button, a frame counter for indicating the number of exposures remaining for picture-taking, a direct see-through viewfinder, a film cartridge, and in some models a fixed electronic flash. A pair of plastic front and rear cover parts house the main body part between them to complete the camera unit. The rear cover part connects to the main body part and/or to the front cover part to make the main body part light-tight. A decorative cardboard outer box contains the camera unit and has respective openings for the taking lens, the shutter release button, the film advance thumbwheel, the viewfinder, the frame counter, and a flash emission window for the electronic flash.

At the manufacturer, the main body part is loaded with the film cartridge and the front and rear cover parts are connected to the main body part and/or to the front cover part to complete the camera unit. Then, an exposed end of a supply spool in the main body part is rotated to factory prewind substantially the entire length of an unexposed filmstrip from the film cartridge onto the supply spool. Lastly, the outer box is placed on the camera unit.

During picture-taking, after the photographer takes a picture, he or she manually rotates the thumbwheel to rotate a film spool of the film cartridge to wind the exposed frame of a filmstrip into the film cartridge. The rewinding movement of the filmstrip the equivalent of slightly more than one frame width rotates the metering sprocket to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed and the filmstrip is completely rewound into the film cartridge, the one-time-use camera is given to a photofinisher who tears the outer box off the camera unit, separates the rear cover part from the main body part, and removes the film cartridge with the filmstrip from the main body part. Then, he removes the filmstrip from the film cartridge to develop the negatives and make prints for the customer, and he forwards the used camera parts to the manufacturer for recycling, i.e. remanufacture.

More recently, an underwater one-time-use camera has been commercialized which comprises a water-resistant casing, a camera unit contained in the water-resistant casing, a manually rotatable thumbwheel positioned outside the water-resistant casing, and coupling means for rotationally coupling the thumbwheel to the film spool of a film cartridge in the camera unit to permit the thumbwheel to be manually rotated to similarly rotate the film spool for film winding. A water-seal rubber o-ring is intended to prevent water from leaking into the water-resistant casing at an opening for the coupling means to connect to the thumbwheel. However, at times the rubber o-ring may not be completely adequate to prevent water from leaking through the opening. Thus, a solution is desired.

SUMMARY OF THE INVENTION

An underwater camera comprising a water-resistant casing, a camera housing contained in the water-resistant casing, a manually rotatable thumbwheel positioned outside the water-resistant casing, and coupling means for rotationally coupling the thumbwheel to a film spool rotatably supported in the camera housing to permit the thumbwheel to be manually rotated to similarly rotate the film spool, is characterized in that the coupling means is a magnetic torque coupling including a driving ring of magnets fixed to the thumbwheel for rotation with the thumbwheel and a driven ring of magnets rotationally engaged with the film spool. The magnets of the driving ring and the magnets of the driven ring are magnetically coupled for synchronous rotation of the driving and driven rings to rotate the film spool when the thumbwheel is rotated.

This arrangement is believed to be an improvement over a rubber o-ring water seal.

DETAILED DESCRIPTION OF THE INVENTION

The invention is disclosed as being embodied preferably in a one-time-use camera. Because the features of a one-time-use camera are generally, the description which follows is directed in particular only to those elements forming part of or cooperating directly with the disclosed embodiment. It is to be understood, however, that other elements may take various forms known to a person of ordinary skill in the art.

Figure 1:
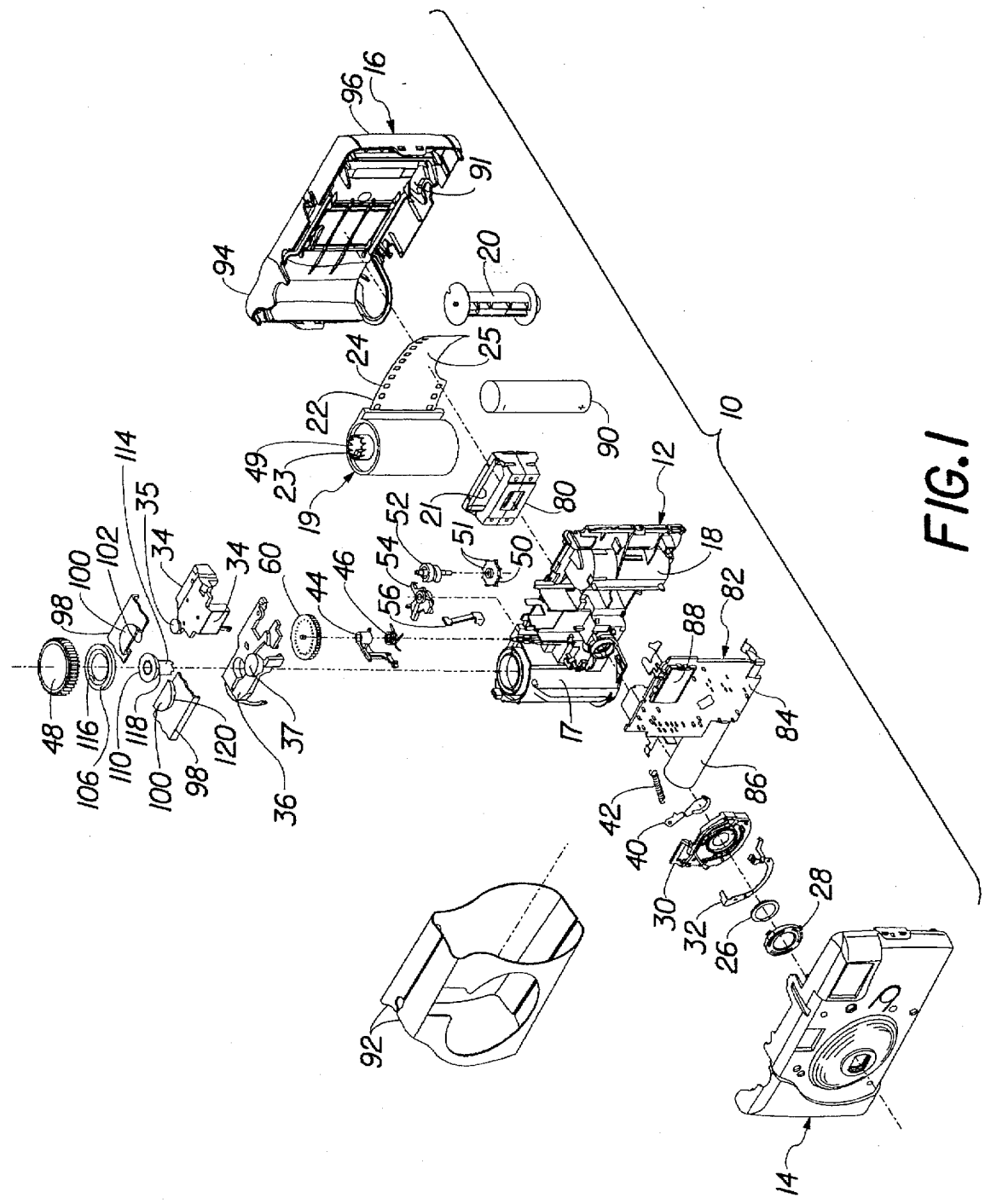
FIG. 1 is an exploded perspective view of an underwater one-time-use camera with a magnetic torque coupling for film winding, according to a preferred embodiment of the invention.
Figure 2:
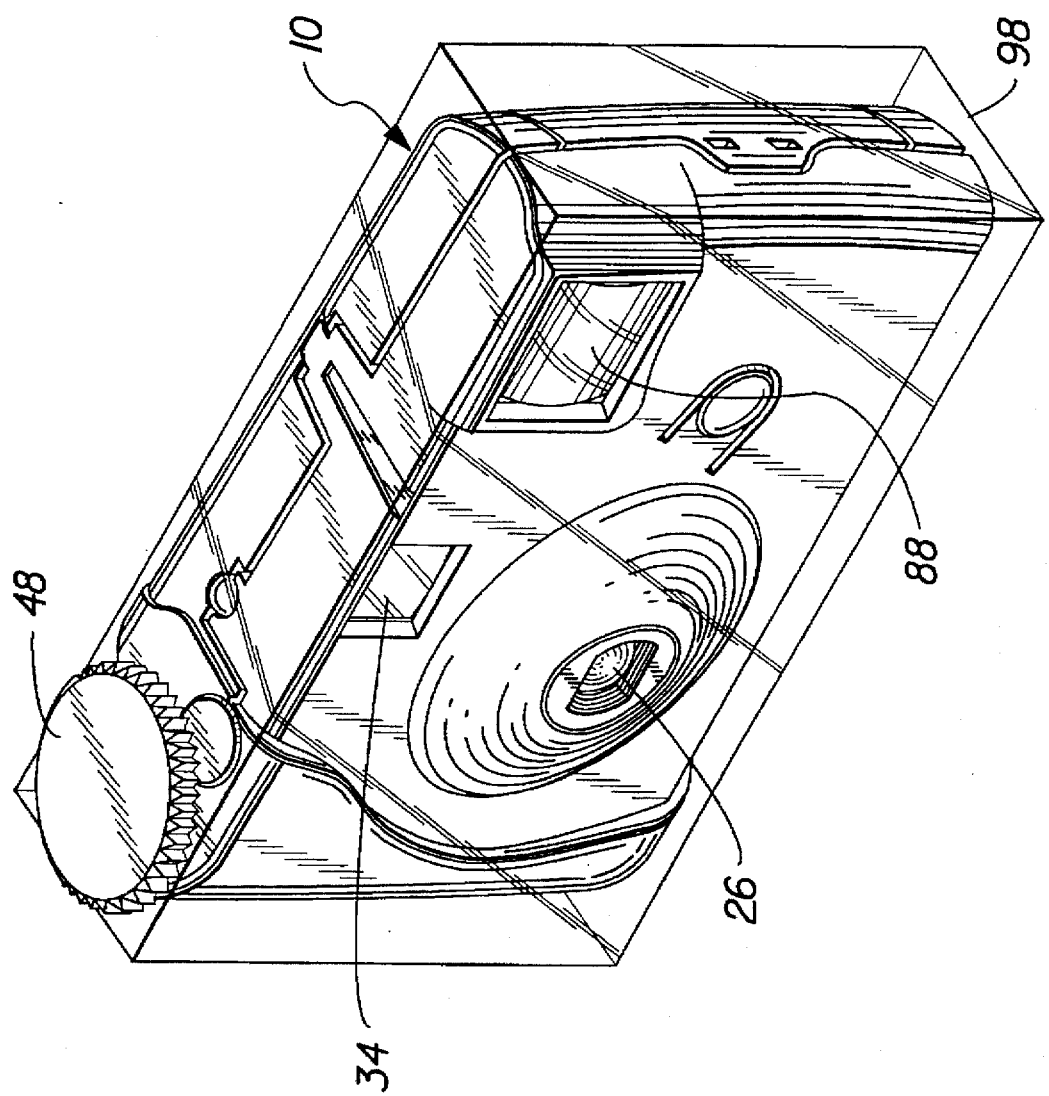
FIG. 2 is an assembled perspective view of the underwater one-time-use camera.

Referring now to the drawings, FIG. 1 depicts a one-time-use camera 10 having a plastic main body part 12, and a pair of plastic front and rear cover parts 14 and 16 which connect to one another to form a camera housing which houses the main body part 12 in order to complete the camera unit. The main body part 12 is adapted to be nested in the front cover part 14, and the rear cover part 16 is intended to be fitted to the main body part 12 to make the main body part light-tight.

As shown in FIG. 1, the main body part 12 has integral cartridge-receiving and film roll chambers 17 and 18 for a light-tight film cartridge 19 and a film take-up spool 20. The chambers 17 and 18 are located at opposite sides of a backframe or film exposure opening 21 at which successive frames of a filmstrip 22 are exposed during picture-taking. The filmstrip 22 is originally stored in a roll form on a cartridge spool 23 rotatably supported inside the film cartridge 19, and has a longitudinal series of edge perforations 24 included along a film leader 25 which protrudes from the film cartridge.

The main body part 12 supports various camera elements which are attached to the main body part before it is nested in the front cover part 14 and the front and rear cover parts 14 and 16 are connected to one another to house the main body part between them. These camera elements are the following: a fixed-focus taking lens 26 which is sandwiched between a snap-on lens retainer 28 and a lens support plate 30 connected to the main body part at its front; a shutter-flash synchronization switch contact 32 attached to the lens support plate 30; a pair of front and rear viewfinder lenses 34 and an integral frame magnifier 35 connected to the main body part at its top; a shutter mechanism comprising a keeper plate 36 having an integral manually depressable shutter release button 37 for releasing a pivotally mounted shutter blade 40, a shutter return spring 42, a high-energy lever 44 for actuating the shutter blade to pivot the blade open in order to uncover the taking lens to make a film exposure, and a lever actuating spring 46; a film advancing and metering mechanism comprising a manually rotatable thumbwheel 48 rotatably coupled to an exposed end 49 of the cartridge spool 23 to rotate the spool in order to wind an exposed frame of the filmstrip 22 into the film cartridge 19 after each film exposure, a film metering sprocket 50 having an annular array of peripheral teeth 51 for successively engaging the respective perforations 24 in the filmstrip, and a cooperating metering cam 52, metering lever 54 and metering spring 56 which operate in a known manner with a rotatable frame counter 60 (made readable via the frame magnifier 37), the winder wheel 48, and the metering sprocket 50 to decrement the frame counter to its next lower-numbered setting and to lock the thumbwheel (until the shutter release button 37 is depressed) after the thumbwheel is rotated to wind an exposed frame into the film cartridge 19; a light baffle 80 which forms the backframe opening 21; and an electronic flash 82 comprising a circuit board 84, a capacitor 86, a flash emission lens 88, and a flash battery 90. The battery is held in a battery-receiving chamber 91 in the main body part 12. A pair of front and rear decorative labels 92 cover central portions of the front and rear cover parts 14 and 16 after the front and rear cover parts are connected to one another to house the main body part 12 between them.

As shown in FIG. 1, a breakaway cartridge-cover door 94 and a breakaway battery-cover door 96 are provided on the rear cover part 16, opposite the cartridge-receiving chamber 17 and the battery-receiving chamber 91. The two cover doors 94 and 96 can be pivoted open along respective hinge grooves along the inside of the rear cover part 16 to remove the film cartridge 19 and the battery 90 from the chambers 17 and 91.

Figure 3:
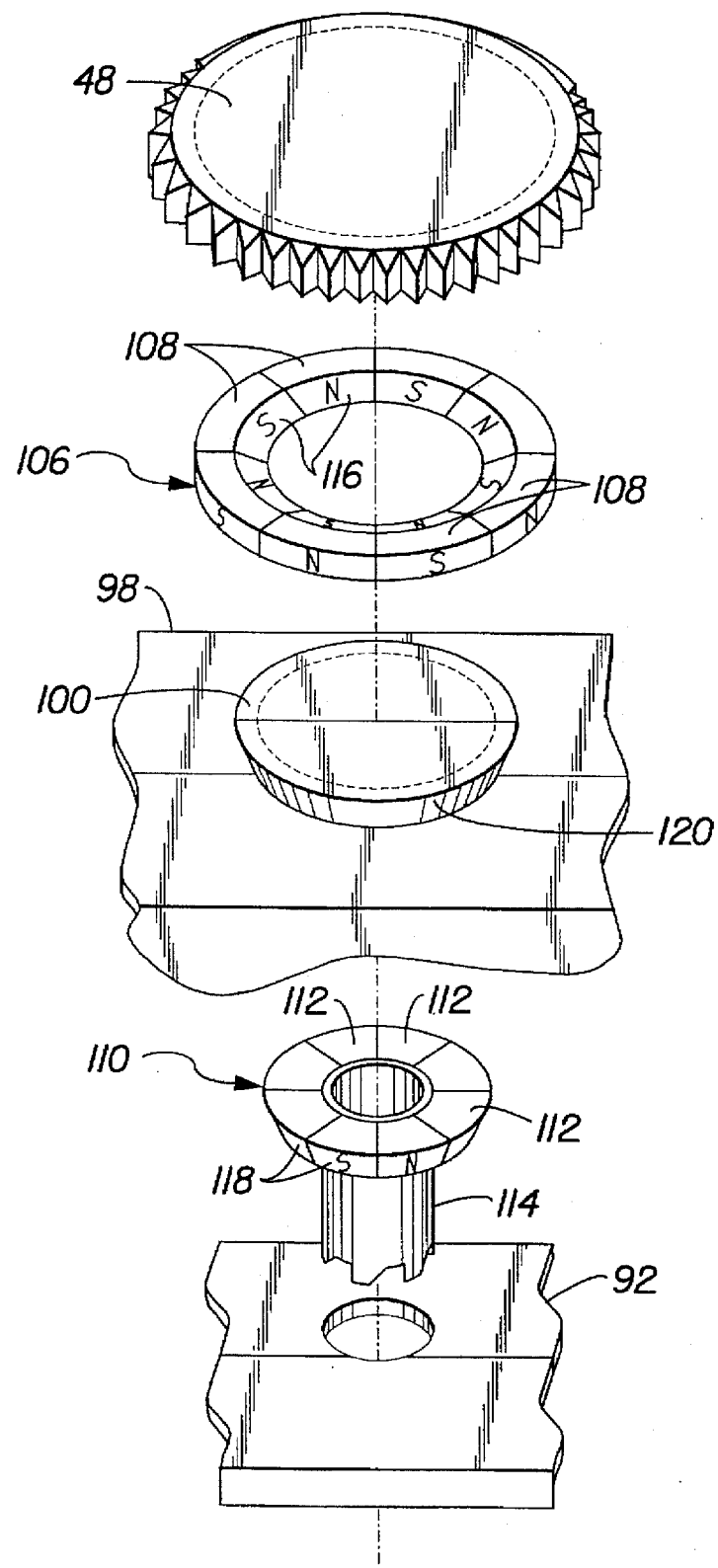
FIG. 3 is an exploded perspective view of the magnetic torque coupling.
Figure 4:
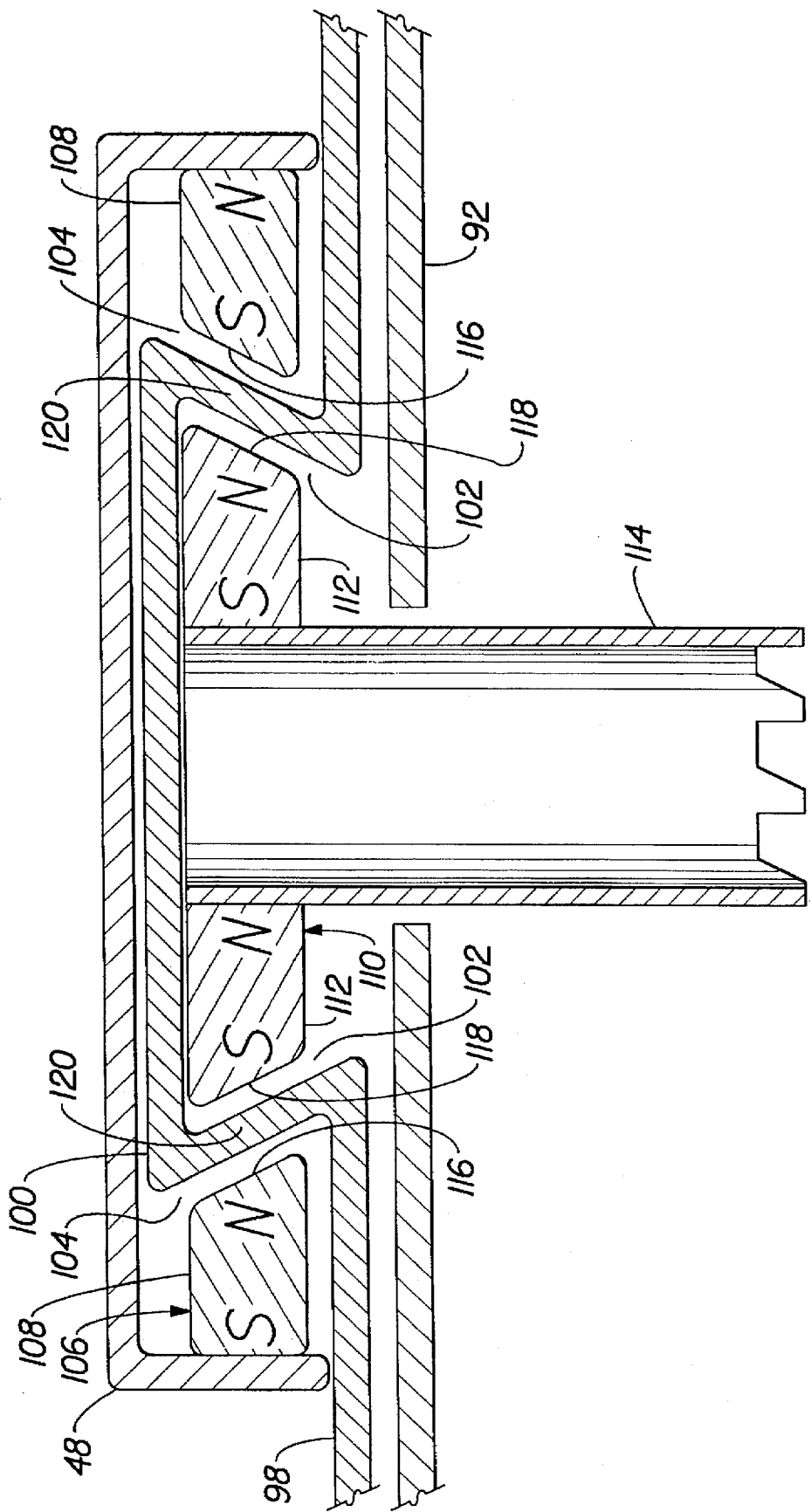
FIG. 4 is an assembled sectional view of the magnetic torque coupling.

As shown in FIGS. 1–4, the one-time-use camera is sealed in a plastic transparent water-resistant casing 98 which has a raised portion 100 surrounding a central space 102. The thumbwheel 48 is supported on the raised portion 100 to be manually rotated around the central space 102, but leaves an annular space 104 between the thumbwheel and the raised portion which is concentric with the central space. See FIG. 4. The thumbwheel 48 is rotatably coupled to the exposed end 49 of the cartridge spool 23 to rotate the spool in order to wind the filmstrip 22 into the film cartridge 19 via a magnetic torque coupling. The magnetic torque coupling is partially similar to the one disclosed in prior art U.S. Pat. No. 5,376,862 and comprises a driving ring 106 of radially polarized, alternating polarity (alternating north and south magnetic poles N and S as shown in FIG. 3), permanent magnets 108 fixed to the thumbwheel 48 in the annular space 104 and a driven ring 110 of radially polarized, alternating polarity (alternating north and south magnetic poles N and S as shown in FIG. 3), permanent magnets 112 rotatably supported in the central space 102 on a hollow shaft 114 coaxially engaged with the exposed end 49 of the cartridge spool 23. See FIGS. 1,3 and 4. The magnets 108 and the magnets 112 are equal in number and are magnetically coupled in a radial sense for synchronous rotation of the driving ring 106 and the driven ring 110 to rotate the cartridge spool 23 when the thumbwheel 48 is manually rotated.

Preferably, the magnets 108 of the driving ring 106 and the magnets 112 of the driven ring 110 have respective opposite ends 116 and 118 facing one another which are complementarily beveled to similarly enlarge the surface areas of the opposite ends. This tends to amplify the mutual attraction of the opposite ends 116 and 118 for each other, which strengthens magnetic coupling of the magnets 108 and 112. See FIGS. 3 and 4. The raised portion 100 of the water-resistant casing 98 has a circumferential wall 120 which is inclined between the facing opposite ends 116 and 118 of the magnets 108 and 112.

The magnets 108 and 112 may be constructed of neodymium iron boron (NdFeB), samarium cobalt (SmCo) or other suitable material.

The invention has been described with reference to a preferred embodiment. However, it will be appreciated that variations and modifications can be effected by a person of ordinary skill in the art without departing from the scope of the invention.

PARTS LIST 10 one-time-use camera
12 main body part
14 front cover part
16 rear cover part
17 cartridge-receiving chamber
18 film roll chamber
19 film cartridge
20 film take-up spool
21 backframe opening
22 filmstrip
23 cartridge spool
24 edge perforations
25 film leader
26 taking lens
28 lens retainer
30 lens support plate
32 shutter-flash synchronization switch contact
34 front and rear viewfinder lenses
35 frame magnifier
36 keeper plate
37 shutter release button
40 shutter blade
42 shutter return spring
44 high-energy lever
46 lever actuating spring
48 thumbwheel
49 exposed end of cartridge spool
50 film metering sprocket
51 peripheral teeth
52 metering cam
54 metering lever 56 metering spring
60 frame counter
80 light baffle
82 electronic flash
84 circuit board
86 capacitor
88 flash emission lens
90 battery
91 battery-receiving chamber
92 front and rear labels
94 cartridge-cover door
96 battery-cover door
98 water-resistant casing
100 raised portion
102 central space
104 annular space
106 driving ring
108 magnets
110 driven ring
112 magnets
114 shaft
116 opposite ends
118 opposite ends
120 circumferential wall

We claim:

1. An underwater camera comprising a water-resistant casing, a camera housing contained in said water-resistant casing, a manually rotatable thumbwheel positioned outside said water-resistant casing, and coupling means for rotationally coupling said thumbwheel to a film spool rotatably supported in said camera housing to permit said thumbwheel to be manually rotated to similarly rotate said film spool, is characterized in that:

said water-resistant casing has an exteriorly raised portion surrounding an interior central space;

said thumbwheel is supported on said raised portion to be rotated around the raised portion, but leaves an annular space between the thumbwheel and said raised portion which is concentric with said central space; and said coupling means is a magnetic torque coupling including a driving ring of radially polarized magnets fixed to said thumbwheel in said annular space and a driven ring of radially polarized magnets rotatably supported in said central space, whereby said magnets of the driving ring and said magnets of the driven ring are magnetically coupled in a radial sense for synchronous rotation of said driving and driven rings to rotate said film spool when said thumbwheel is rotated.

2. An underwater camera as recited in claim 1, wherein said magnets of the driving ring and said magnets of the driven ring have respective opposite polarity ends facing one another which are complemetarily beveled to strengthen magnetic coupling of the magnets of said driving ring and the magnets of said driven ring.

3. An underwater camera as recited in claim 2, wherein said raised portion of said water-resistant casing has a circumferential wall which is inclined between said ends of the magnets of said driving ring and said ends of the magnets of said driven ring that face one another.

4. An underwater camera as recited in claim 1, wherein said magnets of the driven ring are coaxially engaged with said film spool.

5. An underwater camera comprising a water-resistant casing, a manually rotatable thumbwheel positioned outside said water-resistant casing, and coupling means for rotationally coupling said thumbwheel to a film spool rotatably supported inside said water-resistant casing to permit said thumbwheel to be manually rotated to similarly rotate said film spool, is characterized in that:

said coupling means is a magnetic torque coupling including a driving ring of magnets fixed to said thumbwheel for rotation with the thumbwheel and a driven ring of magnets rotationally engaged with said film spool, and said magnets of the driving ring and said magnets of the driven ring have respective opposite polarity ends facing one another and complimentarily beveled to magnetically couple the magnets for synchronous rotation of said driving and driven tings to rotate said film spool when said thumbwheel is rotated.

6. An underwater camera as recited in claim 5, wherein said water-resistant casing includes a wall portion which is inclined between said ends of the magnets of said driving ring and said ends of the magnets of said driven ring that face one another.

* * * * *